United States Patent
Coviello et al.

(10) Patent No.: US 12,001,513 B2
(45) Date of Patent: Jun. 4, 2024

(54) SELF-OPTIMIZING VIDEO ANALYTICS PIPELINES

(71) Applicant: NEC Laboratories America, Inc., Princeton, NJ (US)

(72) Inventors: Giuseppe Coviello, Princeton, NJ (US); Yi Yang, Princeton, NJ (US); Srimat Chakradhar, Manalapan, NJ (US)

(73) Assignee: NEC Corporation, Tokyo (JP)

( * ) Notice: Subject to any disclaimer, the term of this patent is extended or adjusted under 35 U.S.C. 154(b) by 347 days.

(21) Appl. No.: 17/522,226

(22) Filed: Nov. 9, 2021

(65) Prior Publication Data

US 2022/0172005 A1   Jun. 2, 2022

Related U.S. Application Data

(60) Provisional application No. 63/119,288, filed on Nov. 30, 2020.

(51) Int. Cl.
| | |
|---|---|
| *G06V 10/00* | (2022.01) |
| *G06F 9/50* | (2006.01) |
| *G06F 18/21* | (2023.01) |
| *G06N 3/08* | (2023.01) |

(Continued)

(52) U.S. Cl.
CPC .......... *G06F 18/217* (2023.01); *G06F 9/5027* (2013.01); *G06N 3/08* (2013.01); *G06V 10/94* (2022.01); *G06V 20/46* (2022.01)

(58) Field of Classification Search
CPC ........ G06V 20/52; G06V 10/82; G06V 10/94; G06V 20/46; G06V 40/167; G06T 2207/10016; G06T 7/246; G06F 18/217
See application file for complete search history.

(56) References Cited

U.S. PATENT DOCUMENTS

| | | |
|---|---|---|
| 9,710,716 B2 | 7/2017 | Case et al. |
| 10,529,075 B2 | 1/2020 | Khan |
| 10,719,953 B1 | 7/2020 | Ye et al. |

(Continued)

OTHER PUBLICATIONS

Salehe, Mohammad, et al. "Videopipe: Building video stream processing pipelines at the edge." Proceedings of the 20th international middleware conference industrial track. 2019. (Year: 2019).*

(Continued)

*Primary Examiner* — Li Liu

(74) *Attorney, Agent, or Firm* — Joseph Kolodka

(57) ABSTRACT

A method for implementing a self-optimized video analytics pipeline is presented. The method includes decoding video files into a sequence of frames, extracting features of objects from one or more frames of the sequence of frames of the video files, employing an adaptive resource allocation component based on reinforcement learning (RL) to dynamically balance resource usage of different microservices included in the video analytics pipeline, employing an adaptive microservice parameter tuning component to balance accuracy and performance of a microservice of the different microservices, applying a graph-based filter to minimize redundant computations across the one or more frames of the sequence of frames, and applying a deep-learning-based filter to remove unnecessary computations resulting from mismatches between the different microservices in the video analytics pipeline.

20 Claims, 5 Drawing Sheets

(51) Int. Cl.
  *G06V 10/94* (2022.01)
  *G06V 20/40* (2022.01)

(56) References Cited

U.S. PATENT DOCUMENTS

| | | |
|---|---|---|
| 2006/0190419 A1 | 8/2006 | Bunn et al. |
| 2008/0031491 A1 | 2/2008 | Ma et al. |
| 2016/0124742 A1 | 5/2016 | Rangasamy et al. |
| 2018/0114290 A1* | 4/2018 | Paltashev ............... G06T 1/20 |
| 2022/0138004 A1* | 5/2022 | Nandakumar ......... G06N 20/00 |
| | | 718/102 |

OTHER PUBLICATIONS

Yaseen, Muhammad Usman, Ashiq Anjum, and Nick Antonopoulos. "Modeling and analysis of a deep learning pipeline for cloud based video analytics." Proceedings of the Fourth IEEE/ACM International Conference on Big Data Computing, Applications and Technologies. 2017. (Year: 2017).*

Wang, Xiaofei, et al. "Convergence of edge computing and deep learning: A comprehensive survey." IEEE Communications Surveys & Tutorials 22.2 (2020): 869-904. (Year: 2020).*

H. -C. Shih, "A Survey of Content-Aware Video Analysis for Sports," in IEEE Transactions on Circuits and Systems for Video Technology, vol. 28, No. 5, pp. 1212-1231, May 2018, doi: 10.1109/TCSVT.2017.2655624. (Year: 2018).*

* cited by examiner

SELF-OPTIMIZING VIDEO ANALYTICS PIPELINES

RELATED APPLICATION INFORMATION

This application claims priority to Provisional Application No. 63/119,288, filed on Nov. 30, 2020, the contents of which are incorporated herein by reference in their entirety.

BACKGROUND

Technical Field

The present invention relates to microservices-based video analytics pipelines and, more particularly, to the development of a self-optimizing video analytic pipeline that leverages artificial intelligence (AI) technology to periodically self-optimize.

Description of the Related Art

Surveillance cameras are everywhere. Roughly 770 million surveillance cameras are in use today, and that number is expected to jump to one billion very soon. Video analytic techniques are routinely used for a variety of 24×7 applications, including traffic control, security monitoring, and smart factory manufacturing. Video analytic techniques have evolved significantly in the last decade due to the rapid advances in deep learning and classical computer vision techniques. Artificial intelligence (AI) and deep learning continue to be the key enabling technologies behind video content analysis, effectively transforming live or recorded video into structured metadata that can deliver actionable and quantifiable insights.

SUMMARY

A method for implementing a self-optimized video analytics pipeline is presented. The method includes decoding video files into a sequence of frames, extracting features of objects from one or more frames of the sequence of frames of the video files, employing an adaptive resource allocation component based on reinforcement learning (RL) to dynamically balance resource usage of different microservices included in the video analytics pipeline, employing an adaptive microservice parameter tuning component to balance accuracy and performance of a microservice of the different microservices, applying a graph-based filter to minimize redundant computations across the one or more frames of the sequence of frames, and applying a deep-learning-based filter to remove unnecessary computations resulting from mismatches between the different microservices in the video analytics pipeline.

A non-transitory computer-readable storage medium comprising a computer-readable program for implementing a self-optimized video analytics pipeline is presented. The computer-readable program when executed on a computer causes the computer to perform the steps of decoding video files into a sequence of frames, extracting features of objects from one or more frames of the sequence of frames of the video files, employing an adaptive resource allocation component based on reinforcement learning (RL) to dynamically balance resource usage of different microservices included in the video analytics pipeline, employing an adaptive microservice parameter tuning component to balance accuracy and performance of a microservice of the different microservices, applying a graph-based filter to minimize redundant computations across the one or more frames of the sequence of frames, and applying a deep-learning-based filter to remove unnecessary computations resulting from mismatches between the different microservices in the video analytics pipeline.

A system for implementing a self-optimized video analytics pipeline is presented. The system includes a memory and one or more processors in communication with the memory configured to decode video files into a sequence of frames, extract features of objects from one or more frames of the sequence of frames of the video files, employ an adaptive resource allocation component based on reinforcement learning (RL) to dynamically balance resource usage of different microservices included in the video analytics pipeline, employ an adaptive microservice parameter tuning component to balance accuracy and performance of a microservice of the different microservices, apply a graph-based filter to minimize redundant computations across the one or more frames of the sequence of frames, and apply a deep-learning-based filter to remove unnecessary computations resulting from mismatches between the different microservices in the video analytics pipeline.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
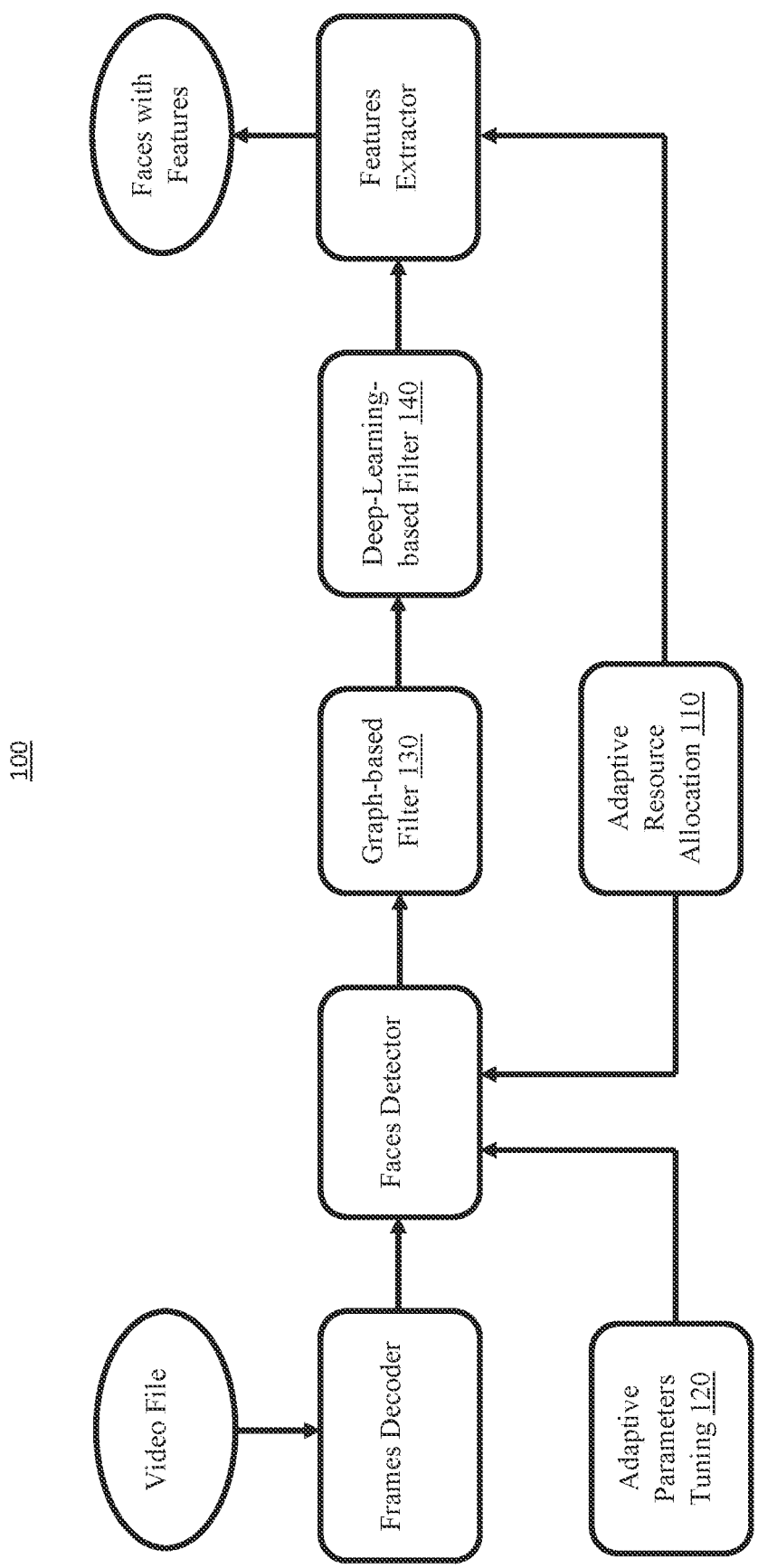
FIG. 1 is a block/flow diagram of an exemplary self-optimizing pipeline, referred to as Magic-Pipe, in accordance with embodiments of the present invention.

A video analytic application includes a pipeline of video processing tasks, or microservices, which leverage a variety of deep convolutional neural networks and computer vision techniques to perform complex video analytics tasks. For example, the pipeline of an application that searches for suspects in live or recorded surveillance videos includes a video decoder, followed by sophisticated deep-learning engines that detect faces in a video frame, and extract characteristics, such as unique facial features. These facial features are subsequently used by another component that searches a database of stored facial features of suspects for a match.

Applying deep convolutional neural networks to video data at scale poses a substantial systems challenge, as improving application response times while ensuring high accuracy insights often requires prohibitive computational resources. While it is promising to balance resource usage, response times and accuracy by selecting a suitable resolution of the input video, the significant impact of the dynamic video content on the resource usage and application response times needs to be addressed.

It is observed that the best allocation of resources to microservices in a pipeline, and the optimal configuration of parameters for each microservice, vary over time, often at a timescale of minutes or even seconds. The exemplary embodiments leverage these observations to develop Magic-Pipe, a self-optimizing video analytic pipeline that leverages artificial intelligence (AI) techniques to periodically self-optimize.

The exemplary Magic-Pipe architecture automatically augments existing microservices-based video analytics pipelines to exhibit self-optimizing capability. First, the exemplary methods propose a new, video content-based adaptive resource allocation technique or component to dynamically balance the resource usage of different microservices, at run-time. This component is integrated into the pipeline as a new microservice. Then, the exemplary methods propose an adaptive microservice parameter tuning technique or component to balance the accuracy and performance of a microservice at runtime. This component is also integrated into the pipeline as a new microservice. Finally, the exemplary methods propose two different approaches to reduce unnecessary computations due to mismatch of microservices, that is, a deep learning-based approach to improve the feature extractor performance by eliminating inputs for which no features can be extracted, and a low-overhead graph-theoretic approach to minimize redundant computations across frames. Both of these techniques or components are incorporated into the analytic pipeline as new microservices.

The evaluation of Magic-Pipe shows that pipelines augmented with self-optimizing capability exhibit application response times that are an order of magnitude better than the original pipelines, while using the same hardware resources, and achieving similar high accuracy.

Video analytic applications are often implemented as a pipeline, or a directed-acyclic-graph (DAG), where the output of one or more tasks is used as input of subsequent tasks. Usually, the input to the DAG is either a video file or a stream from a live camera. Often, the final task in the DAG produces output that is either stored in a persistent store or inserted into queues and made available for further processing.

Designing a video analytic application as a collection of single purpose processing tasks or microservices rather than a monolithic application has several advantages, that is, a microservices-based design promotes the reuse of software components (microservices) across applications, swapping a microservice with a better version (e.g., more accurate or with superior performance) doesn't require extensive re-engineering and debugging of the microservices-based application, and it is easier to split the development effort required to design the analytic application among multiple entities.

The potential impact of hardware resource allocation, microservice parameter tuning, and microservices mismatch on the latency, accuracy and scalability of video analytic pipelines is thus illustrated.

Regarding, hardware resource allocation, the allocation of available hardware resources to different microservices in the analytic pipeline has a big impact on the performance of the pipeline. Also, a static allocation of resources to microservices is often sub-optimal due to the dynamic variations in the video content.

In the exemplary pipeline the frame decoder and the feature extractor microservices are central processing unit (CPU) intensive, while the face detector, in its default configuration, uses only, and intensively, the graphical processing unit (GPU). Thus, there is an opportunity to allocate unused CPU resources of the face extraction microservice to the other tasks like face detection and improve the overall performance of the pipeline. Similarly, for the video with high density of faces, the GPU utilization is consistently low, suggesting that the pipeline will benefit from using the unused GPU resources. The characteristics of the input video that impact performances and optimal resource allocation, such as sparsity of objects per frame, camera motion, can be measured during the run-time of the pipeline.

Dynamic allocation of available hardware resources is a difficult problem, which must take into consideration several aspects that have an impact on the performance of the pipeline, that is:

Each task in a pipeline can have very different needs. Some tasks are compute-intensive, others are network or disk intensive, and some tasks can benefit from the use of special hardware such as a GPU.

Scaling up or down the resources allocated to a microservice will interfere with the performance of other microservices in the pipeline, especially when the available hardware resources are fixed.

Resources used by some tasks are highly dependent on the content of the input video.

Optimal allocation of resources to microservices also depends on the specific type of hardware resources that are available to the analytic pipeline. For example, a good resource allocation scheme for a combination of a high-end multicore CPU and a low-end GPU might not be optimal for a different combination of CPU and GPU.

There are numerous combinations of hardware resources, and static profiling of hardware to determine that the optimal allocation is impractical, especially when the developer or the end-user of the application is unaware of hardware platforms used by various customers to process the analytic pipeline. Even if the developer or the end-user understands the needs of each microservice, and how they interact with each other, it will not be possible to reconfigure the pipeline for each different input video that customers will process. It is noted that the most beneficial aspect for an optimal hardware resource allocation is the dynamic consideration of the impact of the content of the input videos on the utilization of available hardware resources.

Regarding tuning of microservice parameters, values assigned to configuration parameters of a microservice can have a big impact on the performance of the microservice, and hence the performance of the whole pipeline. Thus, another burden for the end-user is to fine tune the parameters of each microservice in the pipeline to achieve optimal performances. It is noted that parameter values that can change the performance of the microservice also affect the accuracy of the output, and the optimal parameter configuration for a microservice is also dependent on the time-varying characteristics of the input video content.

It is noted that the most beneficial aspect for an optimal tuning of microservice parameters is also the dynamic consideration of the impact of the content of the input videos on performance and accuracy of the microservice, and transitively, on the entire analytic pipeline.

Regarding mismatch of microservices, an issue that is observed in microservices-based video analytic pipelines is the waste of computing resources due to unnecessary computations resulting from mismatches between the microservices in the pipeline. The main sources of the unnecessary computations are:

Not all output values of a microservice are good inputs to a subsequent microservice in the pipeline. For example, a feature extractor microservice may be able to extract feature vectors for only a subset of the faces emitted by the faces detector microservice. Even if the feature extractor can extract feature vectors, a feature can be considered as a bad one due to some limits. In one instance, a face with an eye distance of less than 10 pixels is not a good candidate for facial recognition.

Some computations are unnecessarily repeated. As a simple example, if a person's face is visible in a sequence of 100 frames, then repeated detection and feature extraction of the same face can be avoided. However, there are more complex situations where unnecessary computations can be removed or eliminated altogether by leveraging AI techniques.

In view thereof, the exemplary methods present Magic-Pipe to realize a self-optimizing video analytic pipeline.

Video analytic workloads are usually non-stationary, in that both the characteristics of the video as well as the processing platforms tend to change over time. This makes traditional approaches like Bayesian optimization and multi-armed bandits either too expensive for dynamic, real-time adaptation or unsuitable because they assume a stationary environment. In contrast, Magic Pipe's architecture assumes a non-stationary environment, and periodically self optimizes the resources, and microservice configuration parameters in response to changes in the input video content.

The Magic-Pipe architecture automatically augments existing microservices-based video analytic applications to exhibit self-optimizing capability. Specifically, the Magic-Pipe architecture adds wrappers on top of existing microservice so that the proposed self-optimizing techniques can be effectively applied to existing analytic pipelines. However, the intelligence and policies necessary to manage the threads are derived from the proposed techniques like adaptive resource allocation, adaptive parameters tuning, and data filtering, all of which use AI techniques to solve systems problems.

FIG. 1 illustrates the Magic-Pipe architecture 100, which is a self-optimizing video analytic pipeline. First, the exemplary methods propose a video content-based adaptive resource allocation component 110 to dynamically balance the resource usage of different microservices. The adaptive resource allocation component 110 (or adaptive resource allocator) leverages reinforcement learning at run-time. Then, the exemplary methods propose an adaptive microservice parameter tuning component 120 (adaptive microservice parameter tuner) to balance the accuracy and performance of a microservice at run-time. Finally, the exemplary methods propose two different approaches to reduce unnecessary computations, that is, a deep learning-based approach to improve the feature extractor performance by eliminating inputs for which no features can be extracted (deep-learning-based filter 140), and a low-overhead graph theoretic approach to minimize redundant computations across frames (graph-based filter 130). The filtering components 130, 140 are designed to be independent from each other, that is, a user can choose to use none, either or both of them in an augmented pipeline.

Regarding adaptive resource allocation component 110, video analytics pipelines often include multiple microservices, and hardware resource assignments to microservices is usually performed manually by the end-user. The performance of the pipeline is highly dependent not just on the available hardware resources, but also the content of the input video.

Given the variety of hardware platforms and the strong dependence of performance on the input video content, obtaining an optimal allocation of hardware resources to microservices of the pipeline is very difficult. The widely used techniques of auto-scaling based on simple monitoring and scaling up or out of resource hungry microservices are not always applicable, that is, the pipeline might be running on a fixed set of hardware resources (on premise) or the cost for naive scaling out would be prohibitive.

The exemplary methods introduce an automated adaptive resource allocation that is based on reinforcement learning (RL). The use of RL techniques for job scheduling has already proven to be useful. The exemplary embodiments do not design a job agnostic, external scheduler that schedules microservices from different pipelines. Rather, the exemplary methods design an application specific RL model that resides in the application, monitors the interactions among the microservices, and periodically redistributes the fixed hardware resources among the microservices in the application.

The core of the adaptive resource allocation component 110 is the State-Action-Reward-State-Action (SARSA) Reinforcement Learning algorithm. In reinforcement learning, an agent learns over time to behave optimally in a certain environment by interacting continuously with the environment. The agent, during its course of learning, experiences different situations or states in the environment. The agent in a given state can choose from a set of allowable actions to change the state of the environment and reach the next state. Also, each action in a given state results in a possibly different reward (or penalty). The agent over time learns to maximize these rewards to behave optimally in any given state.

SARSA is an on-policy learning algorithm, which means that the agent interacts with the environment and updates its policy based on actions taken. Moreover, SARSA doesn't require a pre-trained model and labeled data.

The environment state in the proposed adaptive resource allocation component 110 is a vector including the following quantities: backlog of the input queue of each microservice, current utilization of system resources (CPU, memory, GPU, GPU memory), a fraction of each system resource assigned to each microservice, and metrics derived from the content of the input video (for example, the number of people per frame).

Since there are many different values for each quantity, there are a large number of environment states that an agent experiences.

The set of actions available to the agent are, e.g., assign more resources to a microservice, remove some resources from a microservice, move some resources from a microservice to another microservice, and take no change.

The immediate reward received by the agent for taking an action is computed as the change in the processing rate of the pipeline:

$$r = \frac{p_{after} - p_{before}}{p_{before}}$$

In addition to the immediate reward the agent receives for an action, the agent also factors in future rewards that may result due to the current action. Accordingly, Q-values are defined for every state and action pair. For example, Q(s, a) is an estimate of how good it is to take the action a in state s. The Q(s, a) estimate takes into account the future rewards that may accrue for taking the action a in the state s, as given below:

$$Q(s,a) \leftarrow Q(s,a) + \alpha[r + \gamma \cdot Q(s',a') - Q(s,a)]$$

In the above equation, the constant a is the learning rate, which controls how much weight is given to new information compared to previously learned Q values. A value of 0 will stop the learning phase, and a value of 1 will only use the most recent information. An operator could set a high value to this parameter (for example 0.9) in the initial deployment or when moving to different hardware platform, to allow the model to quickly assimilate the outcome of actions taken in the new environment. After the initial intensive learning, when a good portion of the Q matrix has been explored, the same operator could lower this value (for example 0.1) to start using the newly assimilated information.

The constant γ is the discount factor, which determines the importance of future rewards. When γ is 0, the agent completely ignores future rewards, and it tries to optimize for immediate rewards. When γ is 1, the agent highly values long term rewards. If an operator expects very high variability in subsequent frames in the input content, the operator can encode this information assigning a very low value to γ (0.1), otherwise a higher value can be used for less variability.

Algorithm 1, reproduced below, describes the main loop of the SARSA algorithm. After observing the current state s, the agent chooses an appropriate action a, which changes the state of the environment to s'. The agent also receives an immediate reward r. In the new state s', the agent assumes that action a' will result in a Q-value of Q(s', a'). The estimated cumulative reward Q(s, a) is computed by using:

$$Q(s,a) \leftarrow Q(s,a) + \alpha[r + \gamma \cdot Q(s',a') - Q(s,a)].$$

After updating Q(s, a) the new state the agent finds itself in is s', and the agent contemplates taking the action a'.

---
Algorithim 1: State-Action-Reward-State-Action loop
---

```
s ← Observe-Environment( )
a ← Choose-Action(Q, s, NoAction, 0)
while Still-Processing( ) do
 |  Perform-Action(a)
 |  r ← Compute-Reward( )
 |  s' ← Observe-Environment( )
 |  a' ← Choose-Action(Q, s', a, r)
 |  Q (s, a) ← Q (s, a) + alpha × [r + gamma × Q (s', a') − Q
 |   (s, a)]
 |  s ← s'
 ⌊  a ← a'
```

Algorithm 1 does not define the policy for choosing the action a. Rather, it assumes there is a policy that ensures all state and action pairs are visited by the agent, an infinite number of times. One way to satisfy this requirement is to define a parameter epsilon. With probability epsilon the policy will propose the "best" action for the state, and with probability 1-epsilon, the agent will choose a random action. Thus, in a learning phase it is common to assign epsilon a small value (e.g., 0.1) to explore the state space. When a large portion of Q values have been accurately estimated, it is common practice to use a higher value of epsilon (0.9-0.99) so that the agent exploits the learned model.

A policy to be used with Algorithm 1 was created for choosing an action, the policy described in Algorithm 2, reproduced below. With probability 1-epsilon, the agent chooses a random action (exploration). If the reward for the action a is negative (e.g., it is a penalty), then the agent reverts the action (for example if the action was to add more resources, then the reverted action is to reduce the resources). The agent chooses the next action as the action that maximizes the reward in the current state. However, if the predicted reward from performing the selected action is less than the reward obtained by the action a, then the policy is to just recommend the action a again. This is a very greedy policy in that it reverts right away any action that results in a loss and keeps repeating an action that gives a better reward.

---
Algorithm 2: Choose-Action: policy for choosing the action to perform
---

```
Input: Q,s,a,r
if rand(0,1) ≥ epsilon then
 ⌊    return Random-Action( )
if r < 0 then,
 ⌊    return Revert(a)
a' ← Max-Action(Q, s)
if r > Q (s,a') then
 ⌊    return a
return a'
```

Regarding, adaptive microservice parameter tuning, and specifically with regard to alternative object detectors, it is common to find a single, monolithic application that does all the three tasks, that is, detect faces in a bitmap image, compute proprietary features for each face, and provide a function to compare the similarity of two feature vectors. The exemplary methods dis-aggregate the functions in a monolithic application into separate object detection and feature extraction microservices. Such dis-aggregation is advantageous for several reasons. First, this allows the use of new, best-in-class object detectors with a legacy feature extraction capability in the monolithic application. Second, legacy monolithic applications can have high compute requirements, and they may not execute on newer manycore processing platforms like general purpose GPUs (GPGPUs). In contrast, conventional object detectors are lightweight, and they can leverage GPGPUs and embedded processors.

Regarding, adaptive microservice parameter tuning, and specifically with regard to microservice parameters, there are two key parameters that affect the performance of video analytics on GPGPUs. The first parameter is the batch size. GPGPUs have a large number of streaming processors, which require a high level of parallelism in the application workload. While deep-learning networks perform well on GPGPUs (when compared to execution on CPUs), the utilization of GPGPU resources is usually not high. One way to increase the utilization of GPGPU processors is to increase the batch size, which is the number of frames that are simultaneously processed on a GPGPU as part of a single batch. A large batch size can improve the utilization of GPGPUs. The second parameter that affects the performance of analytics on GPGPUs is the resolution of the image. A smaller resolution improves the speed of object detection, but it can also result in lower accuracy. Since the object size varies across videos, it is beneficial to find the best resolution for each input video. Overall, batch size can affect the performance of the pipeline, while frame resolution can affect both performance and accuracy of object detection.

Regarding, adaptive microservice parameter tuning, and specifically with regard to tuning parameters using RL, the exemplary methods use SARSA again to tune microservice parameters.

Only the states, actions and reward function that are specific to the tuning of microservice parameters are described herein. The environment state for parameter tuning is a vector with the following two elements, resolution and the batch size, to be used by a GPU detector.

The set of available actions for an agent are as follows: increase the batch size of a GPU detector, decrease the batch size of a GPU detector, increase the resolution, decrease the resolution and make no changes.

The resolution parameter is not set to arbitrary values. The number of choices of resolution is limited by 7 values. The resolution is limited to be one of 180p, 240p, 270p, 360p, 480p, 720p, 1080p. When the resolution is reduced from 480p, it means the exemplary methods use 360p. Similarly, although the batch size can be varied arbitrarily, the exemplary methods limit the batch size to be 1, 2, 5, 6, 10, 15, or 30 so that the search space is restricted.

The exemplary methods compute immediate reward as a function of accuracy and the change in processing rate.

Utilizing different values for the input resolution might change the accuracy of the results (while different batch size will always lead to the same accuracy). To estimate the accuracy of the current resolution setting, the exemplary methods detect the objects on the same small set of frames, utilizing both native resolution and current setting. Since the system only performs the accuracy calculations for a small number of frames to determine the reward for a state and action pair, the cost of additional computations due to the use of the legacy object extractor is negligible. After that, the exemplary methods calculate accuracy as the ratio of the number of common objects detected on native and scaled input frames, and the number of objects detected in the native resolution frames. If the accuracy estimate is lower than a specific number, the reward is considered to be −1. Otherwise, the reward is similar to the reward used above with regard to the adaptive resource allocation.

The exemplary methods define the reward for the GPGPU detector as follows:

$$r = \begin{cases} \frac{p_{after} - p_{before}}{p_{before}}, & \text{if recall} \geq 0.95 \\ -1, & \text{otherwise} \end{cases}$$

Regarding the graph-based filter, the exemplary embodiments describe a low-overhead graph-theoretic approach to minimize redundant computations across frames. In a video, it is common to have multiple detections of the same object in nearby frames. Microservices that use the output of object detection incur redundant computation because the same object is detected multiple times in nearby frames. As a result, a deterministic, graph-theoretic approach is introduced to filter repeated object detections from further consideration.

Algorithm 3, reproduced below, presents the approach to filter repeated objects. Input to the algorithm is the set of objects detected in a small batch of contiguous frames. Each object detection also includes the information about the location of the object in the frame, and the frame number. As the output, the algorithm assigns each input object an identifier, and repeated objects are assigned the same identifier.

---

Algorithm 3: Graph-theoretic approach for filtering redundant detections

Data :Objects
Result:Objects-With-Duplication-Information
G ← Create-Graph(Objects);
foreach c ∈ strongly-Connected-Components(G) do
| f ← Flatten(c);
| f ← Label-Duplicates(f);
| Append!(Objects-With-Duplication-Information, f)
end

---

First, the exemplary methods create a graph G=(V, E), where each object in the input forms a vertex $v_i$ and there is an edge $e(v_i, v_j)$ between two vertices $v_i$ and $v_j$, if and only if, these objects are "close" to each other. To determine if two objects are "close" to each other, the exemplary methods consider their "spatial" as well as "temporal" closeness and compute a "distance" metric.

For "spatial" closeness, the exemplary methods use the "overlap" ratio between the bounding boxes of the objects across frames. For any pair of vertices $v_i$ and $v_j$, the exemplary methods check how much is the overlap ratio between their bounding boxes using the overlap equation below. The higher the overlap ratio, the closer are the objects spatially.

$$\text{overlap } (v_i, v_j) = \frac{\text{area } (v_i \cap v_j)}{\min(\text{area } (v_i), \text{area } (v_j))}$$

For "temporal" closeness, the exemplary methods use the "lag" between the two objects across frames. For any pair of vertices $v_i$ and $v_j$, the exemplary methods use the lag equation below to determine how close they are temporally. The lower the lag ratio, the closer are the objects temporally.

$$\text{lag } (v_i, v_j) = \frac{|\text{frame } \#v_i - \text{frame } \#v_j|}{frameInBatch}$$

The exemplary methods combine this "spatial" and "temporal" closeness into a single "distance" metric. Since the "spatial" and "temporal" closeness are fractions, the exemplary methods use harmonic mean, which is good for fractions, to determine the "closeness." Specifically, the exemplary methods use 1−the harmonic mean between the "overlap" (spatial closeness) and "1−lag" (temporal closeness) to estimate the distance between two objects detected in different frames, which is given in the equation for below. The exemplary methods put an edge between two vertices if this "distance" metric is below a certain threshold.

$$d(v_i, v_j) = 1 - \frac{2 \cdot \text{overlap } (v_i, v_j) \cdot (1 - \text{lag } (v_i, v_j))}{\text{overlap } (v_i, v_j) + (1 - \text{lag } (v_i, v_j))}$$

Second, from the graph created in first step, the strongly connected components are found, to partition the graph into multiple small sub-graphs. The idea is that these vertices (objects) within a sub-graph look similar to each other so that the exemplary methods can only use some of these objects to represent the whole sub-graph. In this step, the label (e.g., cost) on each edge is ignored.

Third, to simplify the sub-graph, the exemplary methods flatten each subgraph into a list of objects. In this step, the exemplary methods calculate the minimum spanning tree by using the cost (distance) computed using for each sub-graph. Then, the exemplary methods use a breadth-first search from the widest non-visited object to sort the objects in the spanning tree. The exemplary embodiments obtain a list where the first element is the object with widest area, and they are sorted using the mutual distance (the first and last element in the list are the objects further from each other in the connected component).

Finally, the exemplary methods use the binary search scheme shown in Algorithm 4, reproduced below, to label duplicates in a flattened connected component. If the first and last objects in the input list of detected objects (which by construction are the two objects with the highest distance) are similar, then all the objects are marked as duplicates of the first element in the list. Otherwise, the input list is split in half and the same function is recursively applied. The key observation is that the exemplary embodiments only have to do feature extraction for a few objects.

---

Algorithm 4: Labeling of duplicates in the flattened connected component

Data :List of detections potentially of the same object f
Result:List of detections with duplicates labeling f
if Length(f) > 1 then
| if Is-Similar(First (f), Last (f) then
| | foreach i ∈ f do
| | | i.DuplicateOf ← First (f).id
| | end
| else
| | l ← Length(f);
| | Label-Duplicates(f [1..(l/2)]);
| | Label-Duplicates(f [(l/2) + 1)..l]);
| end
end

---

Regarding the deep-learning-based filter, the elimination of unnecessary computations resulting from mismatches between the microservices in the pipeline is addressed. The exemplary embodiments describe a deep-learning-based filter to improve the feature extractor performance by eliminating inputs for which no features can be extracted.

A lightweight object detector improves system throughput by utilizing accelerators. However, one potential problem is that the object detector microservice detects a lot more objects than the legacy feature extractor in the monolithic application. Furthermore, the feature extractor cannot extract features for many of the objects detected by the lightweight object detector microservice. In other words, the object detector microservice outputs faces that cannot be processed further by the feature extractor. Such faces are referred to as false positives. Since no features are extracted for such faces, the exemplary methods do not encounter accuracy issues by using the output from the feature extractor. However, the feature extractor performs a lot of unnecessary computations on such false positives, and this can be avoided.

Figure 2:
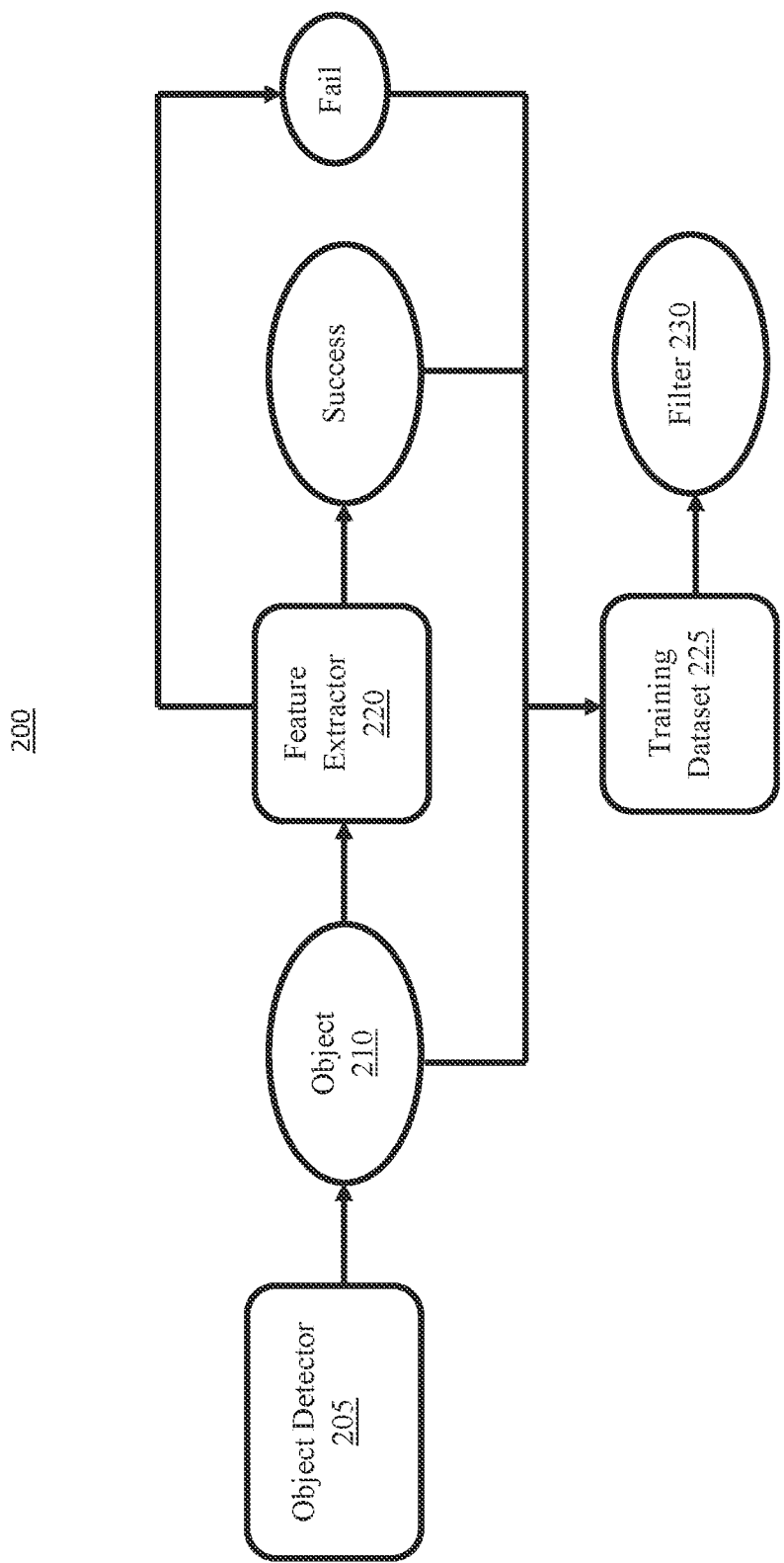
FIG. 2 is a block/flow diagram of an exemplary labeling and training architecture of a deep-learning-based filter, in accordance with embodiments of the present invention.

The exemplary embodiments propose a new, deep-learning-based filter to weed out false positives. FIG. 2 shows the overall training process 200 of the filter. For each object 210 detected by the object detector microservice 205, the feature extractor 220 either succeeds to extract a feature vector or it fails to do so. This allows the system to automatically build a labeled training data set 225 that includes face images and their label ("success" or "failure"). The exemplary methods use such labeled data to periodically train a deep learning binary classifier, which filters false positives from the object detector microservice via filter 230. Training and inference using the binary classifier does consume additional compute resources, and the exemplary methods opt for a small, lightweight model like a Resnet34 that leverages GPGPUs. The automatically generated labeled data has more true positives than false positives, and the exemplary methods do give more weight to true positives during the training procedure. As more videos are processed by the pipeline, the exemplary methods generate more labeled data, without any human intervention, and periodically re-train the binary classifier. Although the deep learning-based filter has the advantage of continuously learning and improving filtering, it does require additional time and compute resources for training. Idle periods in the use of the analytics pipeline can be used to do the periodic training in the background.

In summary, the best allocation of resources to deep learning engines (or microservices) in a pipeline are observed, and the best configuration of parameters for each engine vary over time, often at a timescale of minutes or even seconds based on the dynamic content in the video. The exemplary methods leverage these observations to develop Magic-Pipe, a self-optimizing video analytic pipeline that leverages AI techniques to periodically self-optimize. First, the exemplary methods propose a new, adaptive resource allocation component to dynamically balance the resource usage of different microservices, based on dynamic video content. Then, the exemplary methods propose an adaptive microservice parameter tuning component to balance the accuracy and performance of a microservice, also based on video content. Finally, the exemplary methods propose two different approaches to reduce unnecessary computations due to unavoidable mismatch of independently designed, re-usable deep-learning engines, that is, a deep learning approach (deep-learning-based filter) to improve the feature extractor performance by filtering inputs for which no features can be extracted, and a low-overhead graph-theoretic approach (graph-based filter) to minimize redundant computations across frames.

Figure 3:
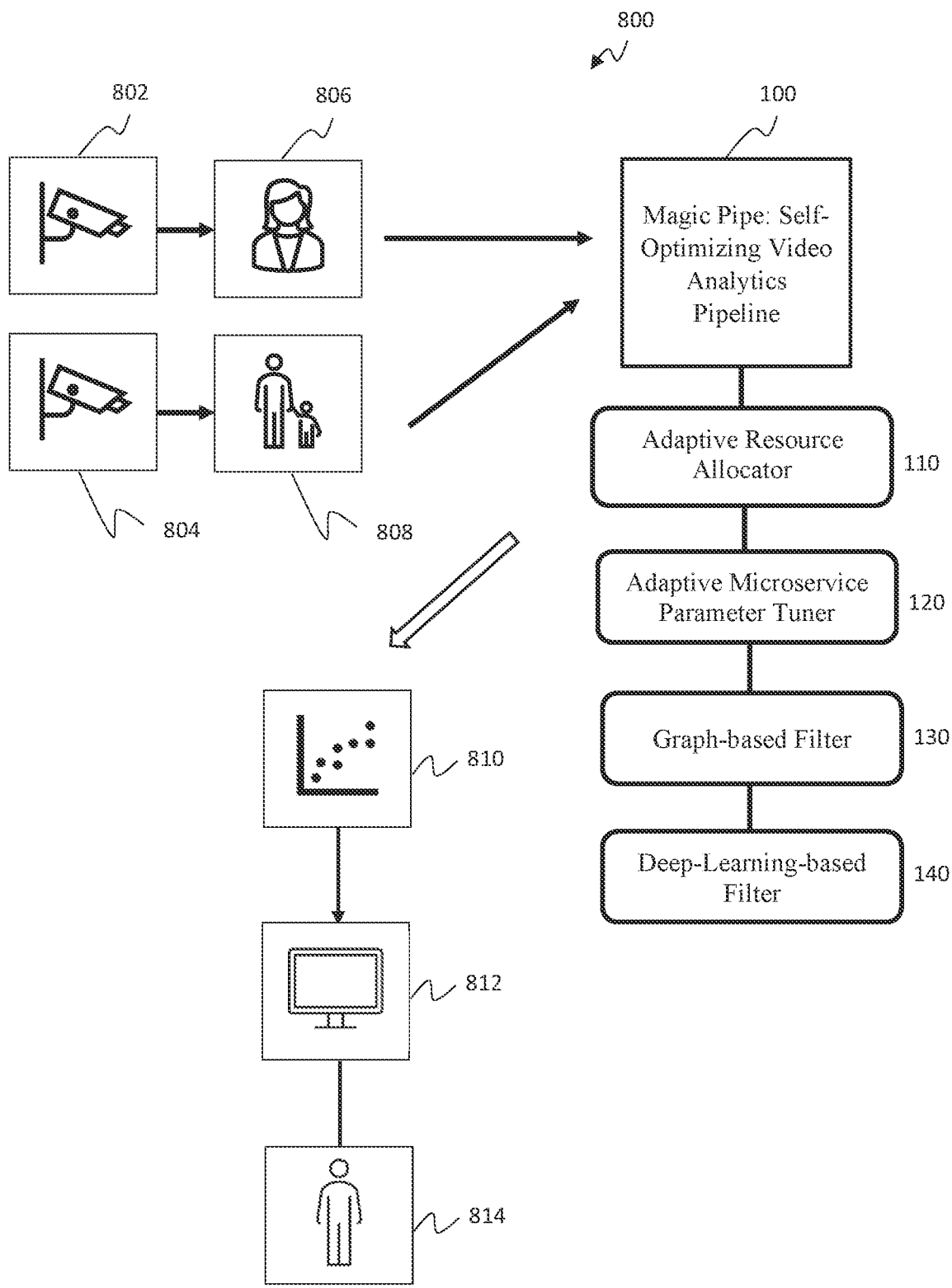
FIG. 3 is an exemplary practical application for implementing a self-optimized video analytics pipeline, in accordance with embodiments of the present invention.

FIG. 3 is a block/flow diagram 800 of a practical application for implementing a self-optimized video analytics pipeline, in accordance with embodiments of the present invention.

In one practical example, a first camera 802 can detect a first object 806 and a second camera 804 can detect a second object 808. The first object 806 and the second object 808 are processed by the Magic Pipe architecture 100 by employing the adaptive resource allocator 110 and the adaptive microservice parameter tuner 120, as well as graph-based filter 130 and deep-learning-based filter 140. The results 810 (e.g., person of interest) can be provided or displayed on a user interface 812 handled by a user 814.

Figure 4:
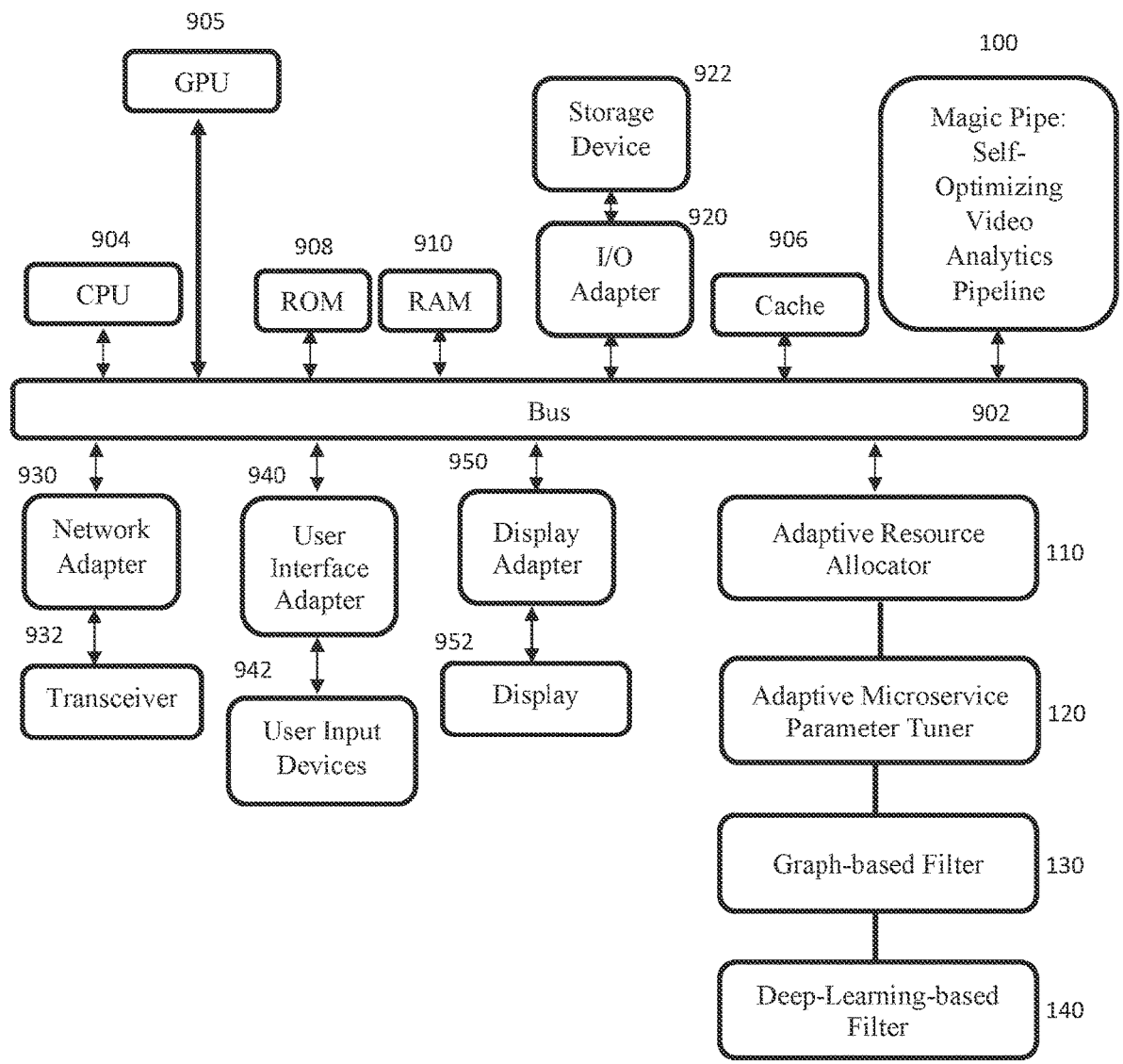
FIG. 4 is an exemplary processing system for implementing a self-optimized video analytics pipeline, in accordance with embodiments of the present invention.

FIG. 4 is an exemplary processing system for implementing a self-optimized video analytics pipeline, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, the Magic Pipe architecture 100 can be employed by the adaptive resource allocator 110 and the adaptive microservice parameter tuner 120, as well as graph-based filter 130 and deep-learning-based filter 140.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 5:
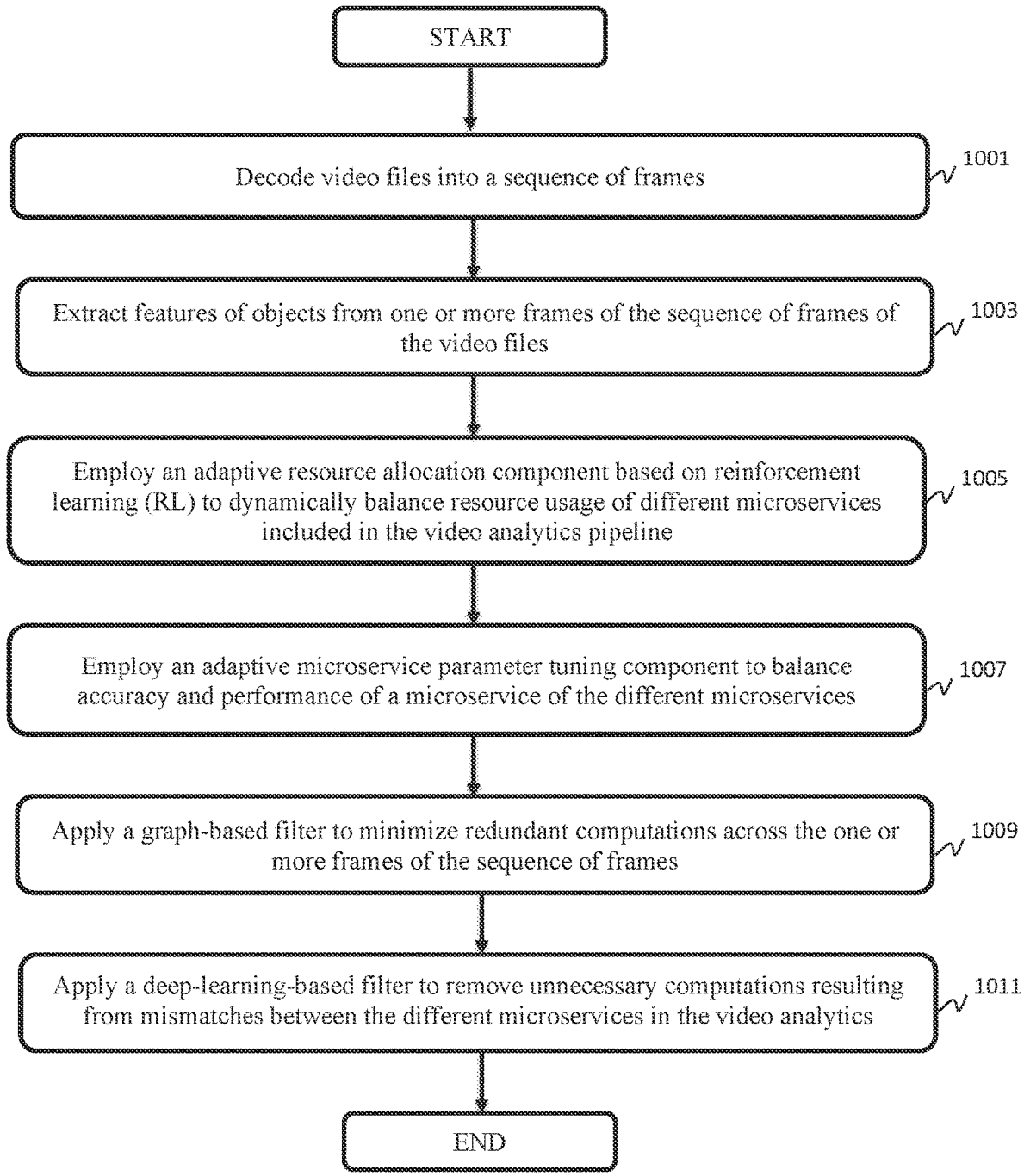
FIG. 5 is a block/flow diagram of an exemplary method for implementing a self-optimized video analytics pipeline, in accordance with embodiments of the present invention.

FIG. 5 is a block/flow diagram of an exemplary method for implementing a self-optimized video analytics pipeline, in accordance with embodiments of the present invention.

At block 1001, decode video files into a sequence of frames.

At block 1003, extract features of objects from one or more frames of the sequence of frames of the video files.

At block 1005, employ an adaptive resource allocation component based on reinforcement learning (RL) to dynamically balance resource usage of different microservices included in the video analytics pipeline.

At block 1007, employ an adaptive microservice parameter tuning component to balance accuracy and performance of a microservice of the different microservices.

At block 1009, apply a graph-based filter to minimize redundant computations across the one or more frames of the sequence of frames.

At block 1011, apply a deep-learning-based filter to remove unnecessary computations resulting from mismatches between the different microservices in the video analytics pipeline.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for implementing a self-optimized video analytics pipeline, the method comprising:
   decoding video files into a sequence of frames;
   extracting features of objects from one or more frames of the sequence of frames of the video files;
   employing an adaptive resource allocation component based on reinforcement learning (RL) to dynamically balance resource usage of different microservices included in the video analytics pipeline;
   employing an adaptive microservice parameter tuning component to balance accuracy and performance of a microservice of the different microservices;
   applying a graph-based filter to minimize redundant computations across the one or more frames of the sequence of frames; and
   applying a deep-learning-based filter to remove unnecessary computations resulting from mismatches between the different microservices in the video analytics pipeline.

2. The method of claim 1, wherein a state in the adaptive resource allocation component is a vector including at least backlog of input queue of each microservice, current utilization of system resources, a fraction of each system resource assigned to each of the microservices, and metrics derived from content of the video files.

3. The method of claim 1, wherein a microservice of the different microservices includes a monolithic application having functions that are dis-aggregated into separate object detection and feature extraction microservices.

4. The method of claim 1, wherein the adaptive microservice parameter tuning component tunes a batch size parameter and an image resolution parameter by RL.

5. The method of claim 1, wherein the graph-based filter removes repeated objects from consecutive frames within the sequence of frames by creating a graph G=(V, E), where each object forms a vertex $v_i$ and an edge $(v_i, v_j)$ between two vertices $v_i$ and $v_j$, if and only if, these objects are close to each other, the closeness of two objects determined by spatial closeness and temporal closeness used to compute a distance metric.

6. The method of claim 5, wherein the spatial closeness employs an overlap ratio between bounding boxes of the objects from the consecutive frames, the overlap ratio given as:

$$\text{overlap } (v_i, v_j) = \frac{\text{area } (v_i \cap v_j)}{\min(\text{area } (v_i), \text{area } (v_j))}.$$

7. The method of claim 5, wherein the temporal closeness employs a lag between the objects from the consecutive frames, the lag given as:

$$\text{lag } (v_i, v_j) = \frac{|\text{frame } \#v_i - \text{frame } \#v_j|}{\text{frameInBatch}}.$$

8. The method of claim 5, wherein the graph is partitioned into multiple sub-graphs, each sub-graph is flattened into a list of objects, and duplicates are labeled in a flattened connected component.

9. A non-transitory computer-readable storage medium comprising a computer-readable program for implementing a self-optimized video analytics pipeline, wherein the computer-readable program when executed on a computer causes the computer to perform the steps of;
decoding video files into a sequence of frames;
extracting features of objects from one or more frames of the sequence of frames of the video files;
employing an adaptive resource allocation component based on reinforcement learning (RL) to dynamically balance resource usage of different microservices included in the video analytics pipeline;
employing an adaptive microservice parameter tuning component to balance accuracy and performance of a microservice of the different microservices;
applying a graph-based filter to minimize redundant computations across the one or more frames of the sequence of frames; and
applying a deep-learning-based filter to remove unnecessary computations resulting from mismatches between the different microservices in the video analytics.

10. The non-transitory computer-readable storage medium of claim 9, wherein a state in the adaptive resource allocation component is a vector including at least backlog of input queue of each microservice, current utilization of system resources, a fraction of each system resource assigned to each of the microservices, and metrics derived from content of the video files.

11. The non-transitory computer-readable storage medium of claim 9, wherein a microservice of the different microservices includes a monolithic application having functions that are dis-aggregated into separate object detection and feature extraction microservices.

12. The non-transitory computer-readable storage medium of claim 9, wherein the adaptive microservice parameter tuning component tunes a batch size parameter and an image resolution parameter by RL.

13. The non-transitory computer-readable storage medium of claim 9, wherein the graph-based filter removes repeated objects from consecutive frames within the sequence of frames by creating a graph G=(V, E), where each object forms a vertex $v_i$ and an edge $e(v_i, v_j)$ between two vertices $v_i$ and $v_j$, if and only if, these objects are close to each other, the closeness of two objects determined by spatial closeness and temporal closeness used to compute a distance metric.

14. The non-transitory computer-readable storage medium of claim 13, wherein the spatial closeness employs an overlap ratio between bounding boxes of the objects from the consecutive frames, the overlap ratio given as:

$$\text{overlap }(v_i, v_j) = \frac{\text{area }(v_i \cap v_j)}{\min(\text{area }(v_i), \text{area }(v_j))}.$$

15. The non-transitory computer-readable storage medium of claim 13, wherein the temporal closeness employs a lag between the objects from the consecutive frames, the lag given as:

$$\text{lag }(v_i, v_j) = \frac{|\text{frame }\#v_i - \text{frame }\#v_j|}{frameInBatch}.$$

16. The non-transitory computer-readable storage medium of claim 13, wherein the graph is partitioned into multiple sub-graphs, each sub-graph is flattened into a list of objects, and duplicates are labeled in a flattened connected component.

17. A system for implementing a self-optimized video analytics pipeline, the system comprising:
a memory; and
one or more processors in communication with the memory configured to:
decode video files into a sequence of frames;
extract features of objects from one or more frames of the sequence of frames of the video files;
employ an adaptive resource allocation component based on reinforcement learning (RL) to dynamically balance resource usage of different microservices included in the video analytics pipeline;
employ an adaptive microservice parameter tuning, component to balance accuracy and performance of a microservice of the different microservices;
apply a graph-based filter to minimize redundant computations across the one or more frames of the sequence of frames; and
apply a deep-learning-based filter to remove unnecessary computations resulting from mismatches between the different microservices in the video analytics pipeline.

18. The system of claim 17, wherein the graph-based filter removes repeated objects from consecutive frames within the sequence of frames by creating a graph G=(V, E), where each object forms a vertex $v_i$ and an edge $e(v_i, v_j)$ between two vertices $v_i$ and $v_j$, if and only if, these objects are close to each other, the closeness of two objects determined by spatial closeness and temporal closeness used to compute a distance metric.

19. The system of claim 18, wherein the spatial closeness employs an overlap ratio between bounding boxes of the objects from the consecutive frames, the overlap ratio given as:

$$\text{overlap }(v_i, v_j) = \frac{\text{area }(v_i \cap v_j)}{\min(\text{area }(v_i), \text{area }(v_j))}.$$

20. The system of claim 18, wherein the temporal closeness employs a lag between the objects from the consecutive frames, the lag given as:

$$\text{lag }(v_i, v_j) = \frac{|\text{frame }\#v_i - \text{frame }\#v_j|}{frameInBatch}.$$

* * * * *